PIERCE W. YARRELL.
Improvement in Frictional Brakes.

No. 125,158.  Patented April 2, 1872.

WITNESSES:
Parker H. Sweet, Jr.
A. H. Norris

INVENTOR:
Pierce W. Yarrell,
By James L. Norris
atty.

UNITED STATES PATENT OFFICE.

PIERCE W. YARRELL, OF GARYSBURG, NORTH CAROLINA.

IMPROVEMENT IN FRICTIONAL BRAKES.

Specification forming part of Letters Patent No. 125,158, dated April 2, 1872.

*To all whom it may concern:*

Be it known that I, PIERCE W. YARRELL, of Garysburg, in the county of Northampton and State of North Carolina, have invented a new and useful Improvement in Frictional Brakes, of which the following is a specification:

My invention relates to certain improvements in that class of devices known as frictional brakes, by which the revolution of revolving shafts and axles can be retarded, and almost instantly cease revolving; and to this end my invention consists of a circular rim or extension formed upon the axle, and to which is adapted a circular friction-cap, consisting of two parts or sections, hinged at one side, and connected together at its opposite side by a rod in the shape of a crank-lever, one end of the crank being connected to the brake-handle or to other suitable means by which it can be operated, and the other parts of the crank-lever being so attached to the two parts of the friction-cap that, by applying power to the upper end of the lever, it will cause the two parts of the friction-cap to approach each other and grasp the extension on the axle, which will, through friction, cause the same to cease revolving, and thus a shaft or car-axle can be stopped whenever desired, and brake obtained which is far superior to the ordinary ones now in use.

Figure 1:
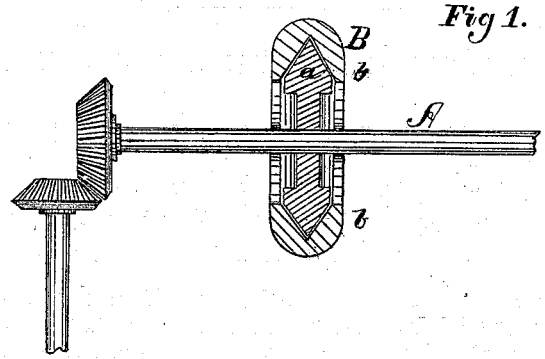
Figure 2:
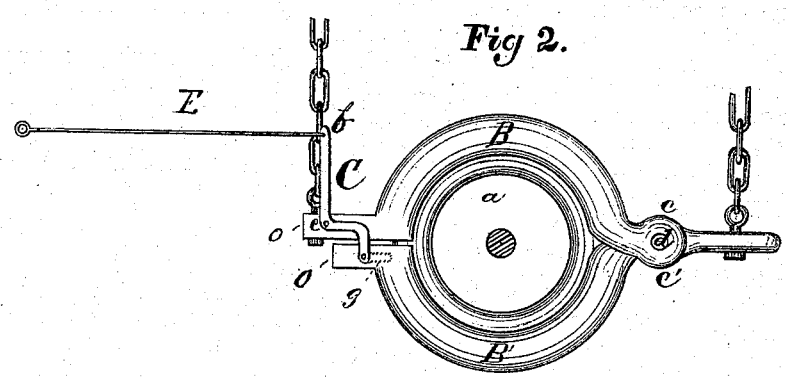
Figure 3:
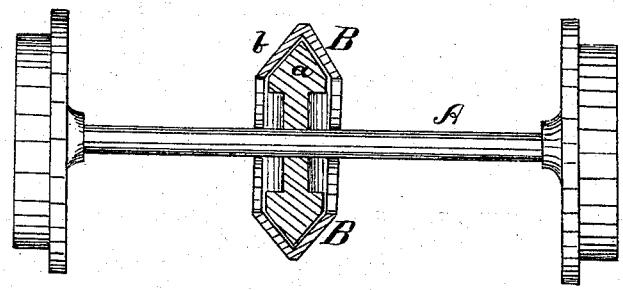

In the drawing, Figure 1 is a sectional view of my improved frictional brake as applied to a shaft; Fig. 2 is a side view of the same; and Fig. 3 is a view showing its application to a car-axle.

A represents a shaft or car-axle, having formed or rigidly secured upon its periphery a rim or extension, *a*, in the form of an inverted V. B B' are two parts or sections of a friction-cap, which have recesses *b b* formed in them of a corresponding V-shaped form, so as to exactly adapt themselves to the rim or extension *a* on the axle. Each side of these friction-caps have small projections, *c c'*, and at the side *c* the two parts B B are hinged or pivoted together by a bolt, *d*, or its equivalent. The projections *o* on the sides of the friction-cap are attached together by a crank-lever, C, one end being connected by a rod or bolt working in a slot, *g*, formed in the part B', and the corner *e* of the crank secured to the part B, and the projecting end *f* is attached to the chain or rod E which is connected to the brake-handle. Each side of the sections B B' are supported by chains or bolts, which are secured to the projecting ends of the parts B B', and they are then connected to the bottom of a car or to a platform, and thus firmly and rigidly secure the friction-cap in its proper position.

When it is desired to stop the car, power is applied to the brake-handle, which will draw the end *f* of the crank-lever forward, which movement will cause the two parts B B' to approach each other and grasp the extension *a* on the axle, and thus the revolution of the same is retarded through the immense friction occasioned, and all twisting of axles avoided.

Instead of connecting the lever C with a brake-handle, it may be attached to a rope or chain which extends a short distance under the car; thence over a small pulley, up through the car, and extends to the outside over a suitable pulley, its end being connected to a weight held or supported by a trip-lever, which can be thrown out of place by the engineer attendant in the car through the means of a small rope attached to the trip or catch-lever. By this means, when it is desired to stop the car, the end of the rope which extends to the engineer can be pulled, which will disengage the trip from the weight and allow the same to drop, and thus draw the two sections together in the same manner as if it were attached to the brake-handle. But I do not limit myself to any particular means of operating the two parts of the friction-cap, as it can be done in any suitable manner by various arrangements of parts.

The above parts can be made of any desirable material, and constructed and applied in any suitable manner.

Instead of the rim *a* being of an inverted V-shape, it may be of semicircular or any other desired shape, of course the recess in the friction-caps being of a corresponding form.

By the above-described construction of a brake one of a much superior efficiency and durability, and one capable of exerting much more force is obtained than by the ordinary construction of brakes.

The above invention is equally applicable whenever a brake for the purpose of stopping a shaft or apparatus is desirable, but is more especially applicable to car-axles.

Instead of a crank-lever being used to operate the sections B B', any desired and suitable device may be employed.

What I claim as new, and desire to secure by Letters Patent, is—

1. The two sections B B', pivoted or hinged together, and operating in connection with the rim $a$ of the axle A. substantially as and for the purpose set forth.

2. The bell-crank lever, in combination with the two sections B B' hinged together, when one of the sections B' is slotted, as at $g$, for the purpose set forth.

3. A friction-brake for axles and shafts, constructed and operating substantially as described.

To the above I have signed my name, this 2d day of September, A. D. 1871.

PIERCE W. YARRELL.

Witnesses:
 JAMES L. NORRIS,
 C. A. VEDDER.